May 3, 1966 E. HOPNER 3,249,763
CLOCK SIGNAL GENERATOR
Filed April 27, 1962
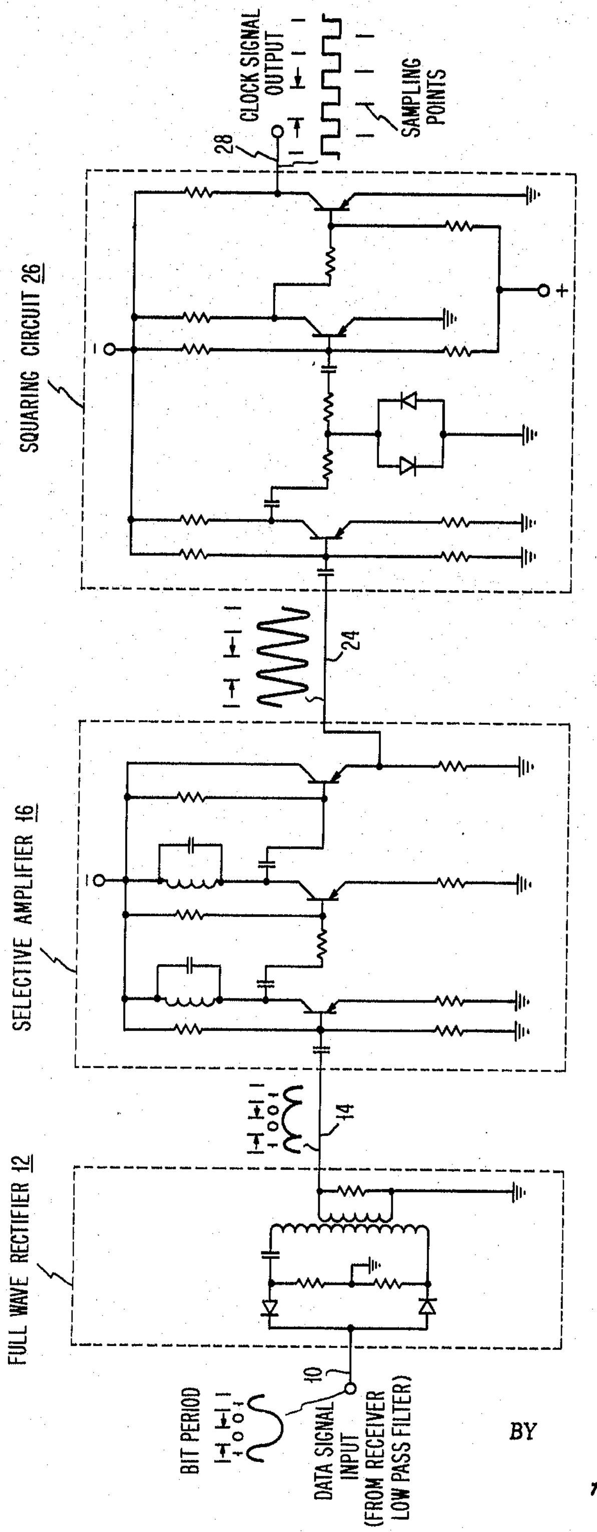
INVENTOR.
EMIL HOPNER
BY
Arthur Decker
ATTORNEY United States Patent Office 3,249,763

Patented May 3, 1966

3,249,763

CLOCK SIGNAL GENERATOR

Emil Hopner, Yorktown Heights, N.Y., assignor to International Business Machines Corporation, New York, N.Y., a corporation of New York Filed Apr. 27, 1962, Ser. No. 190,670
4 Claims. (Cl. 307—88.5)

This invention relates to the reception of signals in digital transmission systems and, more particularly, to the "clocking" means provided at the receiving station for generating a timing signal by which may be defined binary digit (i.e., "bit") periods designating the binary significance of the received signal.

As is known, in order to avoid confusion of binary values characterizing the signal developed in the receiver of a digital transmission or magnetic recording system, some means are required to generate at the receiving or reading station a clock signal having a repetitive wave shape synchronized in frequency and phase with the rate at which the binary signal may be emitted by the transmitter or, if there is no deleterious effect by the transmission medium, with the rate at which the signal is received. A clock signal may have a rectangular wave shape; the pulse repetition rate of the signal is established by the design of its generator and the signal is synchronized with binary transitions in the received signal. Furthermore, if it is of square wave shape, inherent provision for mid-bit period sampling pulses is obtained. Such a clock signal may readily be provided by square wave generators synchronized by transitions of the bit value in the received signal.

Where, over an extensive period of time, there are no transitions in the received signal, i.e., where a continuous series of "one" bits or of "zero" bits are transmitted, there is no synchronization of the generator and, consequently, the frequency of its output may change slightly; the resulting bit periods defined by the clock signal, when keyed to the received signal, may provide erroneous bit information. Therefore, inherent stability of the clock signal throughout the series of bits comprising a word of the message, is required. Instability manifests as a time-wise discrepancy between the received signal and the clock signal and has been designated as a form of "jitter."

In the past, many techniques have been devised to minimize this type of jitter and the effects thereof. One such system utilizes a separately transmitted clock wave which is received, detected and squared to form the clock signal. Synchronization between the binary signal and the clock wave at the transmitter is essential in this system, and equipment must be provided for this purpose; furthermore, a separate channel for clock signal transmission is required and, where plural channels are used, random discrepancy in phase is common. In other systems, where no special clock wave is transmitted, a phase comparison is made between the output of the receiver generator and a frequency reference, such as a tuned fork, and an error signal is developed which is fed back to synchronize the generator. This system is capable of producing a clock signal with precision of 0.1% but is not particularly simple to implement and accuracy with regard to the received transmission is not assured.

It is therefore an object of this invention to provide, at the receiving station of a digital transmission system, a circuit for generating a clock signal characterized by excellent accuracy of synchronization over several bit periods, even where there are no data transitions, with the rate at which binary signals may be sensed in the receiver, by relative independence from the effects of jitter, by low distortion of rectangular waveform and by reliable operation despite oscillator drift in either transmitter or receiver or Doppler shift in the transmission medium.

It is a further object of this invention to accomplish the above with a simple and stable circuit adaptable to variations in bit rate of the received signal.

Briefly, the arrangement of the present invention receives data signal input from the low pass filter following the detector of the receiver and includes a full wave rectifier, a selective amplifier and a squaring circuit the output of which provides the clock signal. Since the low pass filter output signal comprises a wave shape generally sinusoidal in form, the frequency of which corresponds to transitions of bit value in the received signal, the full wave rectifier output signal comprises a sequence of unidirectional half-sinusoidal pulses. This signal has a high harmonic content, the second harmonic of the frequency of the received carrier being prominent. The selective amplifier is tuned to the second harmonic frequency and thus responds to the full wave rectifier output signal to emit a sinusoid the frequency of which corresponds to that of the bit period of the received data signal. This signal is fed to the squaring circuit for shaping to form the square wave clock signal for the system. Effectively, then, the present circuit is a clock frequency generator which is synchronized at every bit of the data signal, and has a sufficient inherent stability to emit a satisfactory clock signal throughout a word of message.

The foregoing and other objects, features and advantages of the invention will be apparent from the following more particular description of a preferred embodiment, as illustrated in the accompanying drawing.

The figure is a schematic diagram of that part of the receiving system for binary data transmission signals including the invention, together with wave shape diagrams depicting, at various portions, signals corresponding to an exemplary received, detected and filtered data signal.

Referring thereto, the data signal input, on line 10, is to full wave rectifier 12 from the receiver low pass filter (not shown), and may be of the non-return-to-zero form as shown by the example 1001, requiring four serial bit periods. Full wave rectifier 12 emits, on line 14, a signal, which, in the preferred case, lacks negative excursions, but which, when keyed to the bit periods, contains the same information as the data signal input. Line 14 feeds to selective amplifier 16 in which tuned circuits 18 and 20 provide an oscillatory rate approximately double the repetition rate of the bit periods and are excited by each data pulse. For purposes of isolation, an emitter follower stage 22 is included as part of selective amplifier 16, the output signal of which is shown on line 24 as comprising a sinusoid, the frequency of which corresponds to that of the bit periods. This signal is squared by squaring circuit 26 to form, on line 28, the system clock signal output, the trailing edges of which, it will be noted, may be considered mid-bit period sampling points and may be differentiated to form corresponding sampling pulses by which the bit content of the data signal may be recognized.

Those skilled in the art will now appreciate that the system of the invention as illustrated in the example described, is simple and reliable and admirably suited to fulfill the objects stated. However, it should be apparent that the forms of the components may be different from those shown and they will still perform functionally within the constraints imposed by the example. Additionally, it is not intended that the invention be limited to the specific arrangement of components chosen as preferred since other connections may operate similarly.

While the invention has been shown and described with reference to a preferred embodiment thereof, it will be understood by those skilled in the art that various changes in form and details may be made therein without departing from the spirit of the invention nor the scope of the invention.

What is claimed is:

1. In a receiving system for electrical signals, means for providing a clock signal synchronized with the received data signal comprising:

a circuit responsive to the data signal to emit a signal having a harmonic at the frequency corresponding to the pulse repetition rate of the desired clock signal;

selective circuit means tuned to the frequency of the harmonic and responsive to each pulse of the signal of said circuit to generate an output signal, said selective circuit means including an oscillating circuit which generates the output signal throughout a word of message even when there are no data transitions in the received data signal;

squaring means; and bilateral means coupling said selective circuit means to said squaring means.

2. The system of claim 1 wherein the data signal is derived from the receiver low pass filter.

3. The system of claim 1 wherein said circuit for generating the harmonic signal comprises a full wave rectifier.

4. The system of claim 3 wherein said selective circuit is tuned to the second harmonic of the frequency corresponding to the pulse repetition rate of the desired clock signal.

References Cited by the Examiner

UNITED STATES PATENTS

| | | | |
|---|---|---|---|
| 2,459,822 | 1/1949 | Lalande | 331—53 X |
| 2,478,629 | 8/1949 | Hiehle | 331—53 X |
| 2,768,299 | 9/1956 | Boff | 331—53 |
| 2,995,669 | 8/1961 | Hugenholtz | 307—88.5 |
| 2,996,578 | 8/1961 | Andrews | 178—70 |
| 3,007,143 | 10/1961 | Hagopian | 328—32 X |

ARTHUR GAUSS, *Primary Examiner.*